United States Patent Office 3,180,843
Patented Apr. 27, 1965

3,180,843
SALTS OF 1,2-DICARBOXYLIC COPOLYMERS AS THICKENERS FOR NON-POLAR SOLVENTS
Richard T. Dickerson, Midland, Mich., assignor to The Dow Chemical Company, Midland, Mich., a corporation of Delaware
No Drawing. Filed Nov. 9, 1960, Ser. No. 68,155
8 Claims. (Cl. 260—30.6)

The present invention relates to thickened compositions and more particularly it concerns compositions comprising non-polar solvents having dissolved therein a minor proportion of an alkali metal salt of certain polymeric poly-1,2-dicarboxylic acids and anhydrides.

A principal object of the present invention is to provide homogeneous, thickened non-polar solvent compositions. A particular object of the invention is to provide thickeners that can be formed in situ within the non-polar solvent to be thickened. Another object is to provide thickeners which are highly effective in relatively low concentrations. A further object of the invention concerns providing means for increasing the viscosities of non-polar solvents over wide temperature ranges. Other objects will become apparent hereinafter as the invention is more fully described.

It has been discovered that, in accordance with the invention, certain non-polar solvents are thickened by incorporating into them, as a solute, a minor proportion of an alkali metal salt of a lipophilic, linear polymeric polycarboxylic acid containing in combined form from about 0.025 to about 3 mole percent of an ethylenically unsaturated 1,2-dicarboxylic acid, or from about 0.05 to about 10 mole percent of an ethylenically unsaturated 1,2-dicarboxylic acid anhydride copolymerized with one or more ethylenically unsaturated lipophilic monomers. The alkali metal polymeric polycarboxylates of the invention are further characterized in that they contain from at least about 0.05 to an upper limit of about 3 alkali metal carboxylate groups per 100 combined monomer units with the remainder of the 1,2-dicarboxyl groups of the polymer existing either in an esterified form or as anhydrides.

The monovalent metal polymeric polycarboxylates of the invention can be incorporated into the non-polar solvents to be thickened in any convenient manner such as by directly dispersing them into the non-polar solvent. However, it is most advantageous to form the alkali metal salts of the polymeric polycarboxylic acids in situ within the non-polar solvent to be thickened. In carrying out the invention in the latter manner, a suitable quantity of a lipophilic, linear polymeric polycarboxylic acid of the invention is dissolved in the non-polar solvent to be thickened and while therein, brought into and maintained in the presence of an effective quantity of a monovalent alkali metal cation or mixture of such cations. An "effective quantity" refers to an alkali metal ion concentration at which substantial thickening is achieved. Usually, at least about 0.05 alkali metal carboxylate groups per 100 combined monomer units is sufficient to provide a substantial thickening effect.

When the polymeric polycarboxylic acid contains about 3 mole percent or less of the ethylenically unsaturated 1,2-dicarboxylic acid or the anhydride thereof in chemically combined form, the total chemical equivalents of the alkali metal cation employed in the thickened composition may be several times the chemical equivalents of the carboxyl functionality of the polymer. However, when the polymeric polycarboxylic acid contains in excess of about 3 mole percent of the ethylenically unsaturated 1,2-dicarboxylic acid anhydride in chemically combined form, the maximum amount of the alkali metal cation that can be employed is that amount which is sufficient to provide at least about 0.05 and up to, but no more than, about 3 alkali metal carboxylate groups per 100 combined monomers.

The quantities of the metal cation and polymeric polycarboxylic acid employed and the frequency of occurrence of the carboxyl group pairs on the polymeric chain are important variables having a pronounced influence upon the extent of the thickening that is achieved. By manipulation of these variables, it is possible to achieve controlled increases in the viscosity of non-polar solvents with small quantities of the alkali metal polymeric polycarboxylates of the invention over wide temperature ranges.

Hereinafter for the purposes of this specification and appended claims, the terminology "non-polar solvent" shall comprehend the group of non-polar organic solvents consisting of aromatic hydrocarbons, halogenated aromatic hydrocarbons and halogenated aliphatic hydrocarbons. Also to be included for the purposes of the present invention within the group of operable non-polar solvents are the mononitro-substituted aromatic hydrocarbons, trialkyl and triaryl phosphates, carbon disulfide and alkyl and aryl thioethers. Mixtures composed of a major proportion of one or more of the foregoing materials are also within the meaning of non-polar solvent.

The scope of operable non-polar organic solvents is further delineated by means of the solvent solubility parameter as defined by Hildebrand and Scott, The Solubility of Nonelectrolytes, 3rd Edition, American Chemical Society, Reinhold Publishing Corp., New York (1950). On page 435, these authors refer to the portions of their book in which the term "solubility parameter" is defined and then proceed to list solubility parameters for selected materials. Pursuant to the solubility parameters reported therein, the class of non-polar solvents operable in the present invention has a solubility parameter range at 25° C. from about 8.2 to about 10.5. This solubility parameter generally correlates with other work reported in the field of solvent characterization which employs the terminology "cohesive energy density" as a parameter of solvent strength, according to the equation:

Solubility parameter (Hildebrand et al.) = $\sqrt{\text{Cohesive energy density}}$ Specific examples of solvents that are operable are such aromatic hydrocarbons as benzene, toluene, ethylbenzene, xylene, propylbenzene, naphthalene, mesitylene, styrene, ar-methyl styrene, tetralin and the like. Other hydrocarbons that can be employed are the essentially aromatic hydrocarbons that can be obtained, for example, as distillation cuts from petroleum stocks and coal oils. Various halogenated aliphatic and aromatic materials that can be effectively thickened in accordance with the present invention include methyl chloride, methylene chloride, carbon tetrachloride, methyl bromide, methyl iodide, ethyl chloride, ethyl bromide, 1,2-dichloroethane, 1,2-dibromoethane, 1,1,1-trichloroethane, 1,2-dichloroethylene, propylene chloride, amyl chloride, chlorobenzene, dichlorobenzene, trichlorobenzene, tetrachlorobenzene, hexachlorobenzene, chlorotoluene, bromotoluene, chloroethylbenzene and the like materials. Additional non-polar solvents that are operable are the mononitro aromatic hydrocarbons such as nitrobenzene, nitrotoluene and the like materials, the alkyl and aryl thioethers such as diethyl sulfide, dimethyl sulfide, methyl ethyl sulfide, diphenyl sulfide, methyl phenyl sulfide and the like materials, carbon disulfide and the triaryl and trialkyl esters of phosphoric acid such as triethylphosphate, tricresylphosphate and the like.

Most of the above-specified non-polar solvents are normally liquid at room temperatures. Liquidity at normal temperatures, however, is not a requirement for operability as good results can be obtained in accordance with the present invention in melts of solids that are obtained at temperatures below that temperature which is the upper limit of thermostability for the metal polymeric polycarboxylate that is employed. Good results are also obtained when the non-polar solvent is gaseous or readily vaporized at normal room temperatures and must either be pressurized or cooled, or both, to maintain it in a liquid state.

The polymeric polycarboxylic acids employed in the present invention to form alkali metal polymeric 1,2-dicarboxylates are non-crystalline, lipophilic, i.e., oil soluble, linear copolymers. As employed herein, the term "linear" refers to the absence of substantial cross-linking between polymer chains but does not preclude the inclusion of graft copolymers or branched linear copolymers. Essential requisites for operability of the polymeric polycarboxylic acids of the invention are that they be miscible with the non-polar solvents to be thickened and contain at least about 0.05 carboxylate-forming sites per 100 combined monomer units. Miscibility can be simply ascertained by stirring a small quantity of about 10 percent or so by weight of the polymeric polycarboxylic acid into the non-polar solvent to be thickened and observing whether or not a visually continuous or homogeneous solution is obtained.

The 1,2-dicarboxylic acid or anhydride copolymers employed as starting materials in the present invention can be prepared, for example, by copolymerizing ethylenically unsaturated, lipophilic monomers with a suitable quantity of an ethylenically unsaturated 1,2-dicarboxylic acid or anhydride thereof. Ethylenically unsaturated lipophilic monomers that can be employed with exceptional advantage are the oil soluble ethylenically unsaturated hydrocarbons and halo-substituted hydrocarbons which may be either aliphatic or aromatic. Exemplary of such lipophilic monomers are propylene, butylene, styrene, ar-ethyl styrene, ar-propyl styrene, vinyltoluene, vinylxylene, vinylmesitylene, ar-bromostyrene, ar-chlorostyrene, ar-dichlorostyrene, ar-trichlorostyrene and the like aliphatic and aromatic, substituted and unsubstituted olefins.

Other sources of lipophilic monomers are ethylenically unsaturated organic materials which, while containing hydrophilic foci such as, for example, ether, carbonyl, amide or amine linkages or such substituents as hydroxyl or oxy-acid groups, are sufficiently lipophilic by virtue of large hydrocarbon portions thereof, to provide, when polymerized, oil-soluble polymers. Examples of the latter materials are the vinyl esters of aliphatic and aromatic acids, alkyl esters of acrylic and substituted acrylic acids and the like materials such as vinyl butyrate, vinyl benzoate, ethyl acrylate, methylmethacrylate, etc.

Examples of polymerizable unsaturated 1,2-dicarboxylic acids that may be incorporated into the polymeric polycarboxylic acids by direct or graft polymerization techniques include maleic, fumaric, itaconic, citraconic, mesaconic and the like unsaturated vicinal dicarboxylic acids, i.e., dicarboxylic acids having carboxyl groups on adjacent consecutive carbon atoms, and anhydrides thereof. It should also be understood that esters, salts and acylhalides of the foregoing acids which can be saponified and subsequently acidified, hydrolyzed or simply acidified, as the case need be, are also operable. Similarly, nitriles or amides of the foregoing acids can also be copolymerized and hydrolyzed after polymerization to provide the desired carboxylic acid functionality.

The polymeric polycarboxylic acids of the invention are prepared by known means. They may be prepared by any suitable batch or continuous polymerization technique. The ethylenically unsaturated lipophilic and the ethylenically unsaturated 1,2-dicarboxylic acids are mixed in suitable proportions to provide the desired frequency of carboxyl groups in the resulting copolymer. The copolymerization reaction may be carried out in the presence or absence of a solvent or other dispersing medium and initiated with one or more of catalyzing means such as heat, light, radiation and free radical-providing chemical compounds. Suitable catalysts of the latter category include such peroxidic compounds as the alkali metal and ammonium persulfates and perborates, hydrogen peroxide and organic peroxides and hydroperoxides such as, for example, benzoyl peroxide, tertiary butyl hydroperoxide and tertiary butyl perbenzoate.

Often it may be desirable, when employing such ethylenically unsaturated, vicinal dicarboxylic acids or the anhydrides thereof as, for example, maleic anhydride, to utilize special techniques to obtain a homogeneous and uniform polymeric product. It is well known in the art that maleic anhydride possesses a strong propensity for copolymerizing in equimolar proportions with monomers copolymerizable therewith. Such equimolar polymeric products are clearly outside the scope of the invention and thus steps must be taken in such polymerization reactions to inhibit or otherwise prevent the formation of such equimolar copolymers. The preparation of the desired copolymers containing maleic anhydride can be accomplished by carrying out the polymerization reaction in such fashion that the maleic anhydride is maintained at a low concentration in the reaction mixture. For this purpose, a continuous process is most convenient since the concentration of the maleic acid or similar monomer can be maintained at a concentration level below that at which the formation of the equal molar polymeric product predominates.

Having prepared the polymeric polycarboxylic acid of the invention, a quantity thereof which may be a greater amount but which is usually in a range from about 0.1 to about 10 percent by weight of the solvent for effective results and which is preferably within a range from about 1 to about 6 percent by weight of the solvent, is dissolved in the non-polar solvent to be thickened. Next, a metal salt of a weak organic acid, which is soluble in and preferably dissolved in part of the non-polar solvent to be thickened and which comprises the alkali metal cation to be employed in combination with the conjugate anion of an organic acid weaker than the polymeric polycarboxylic acid, is added to the non-polar solvent solution of the polymeric polycarboxylic acid in an amount sufficient to cause a desired increase in the solution's resistance to flow. The above term "weaker" means that the anion of the weak organic acid must have the ability to deprotonate the pendant carboxylic acid groups of the 1,2-dicarboxylic acid copolymer or the ability to split anhydrides thereof with the resulting formation of the metal salt thereof. The term "acid" as employed above in relation to the polymer refers to vicinal carboxyl groupings which may exist either as free carboxyl groups or in an anhydride form.

It should be noted that the order in which the 1,2-dicarboxylic acid copolymer and the metal salt of the weak organic acid are added to the non-polar solvent to be thickened is not critical. Any convenient means of achieving such a solution may be employed which includes adding either or both thickening reactants to the non-polar solvent as dry powders or in a solution miscible with the non-polar solvent.

Weak organic acids that can be employed in the invention include the oil-soluble long chain alkanols, alkyl carbonates, alkyl and aryl mercaptans, alkyl and aryl sulfites and the like weak organic acids that do not form stable complexes with the alkali metal ion being employed as would, for example, a chelating agent, e.g., acetylacetone. Generally, alkyl chains of at least 4 carbon atoms are needed to impart the necessary oil solubility to weak organic acids such as the alkanols. However, it is preferred that such alkyl chains contain 8 or more carbon atoms. Specific examples of operable weak organic acids are octanol, 2-octyl carbonic acid, methyl carbonic acid, dodecyl carbonic acid, ethyl and octyl mercaptans, 2-octyl sulfurous acid and phenyl sulfurous acid.

Weak organic acids that have been found to be highly effective in the invention are the alkyl-substituted phenols such as tertiary-butyl phenol, octyl phenol, dodecyl phenol and the like. Alkali metal phenolates are prepared by mixing stoichiometric quantities of the metal, metal oxide, hydroxide or alcoholate with the alkyl phenol in a solvent such as a lower alkanol. The solvent is then separated by evaporation and the residue comprising the alkali metal alkyl phenolate is dissolved in a non-polar solvent, preferably the solvent that is to be thickened. This solution may then be filtered and made up to desired concentrations which can be determined when precise control of this variable is necessary, by simple volumetric titration with a standard acid.

The thickening action of the alkali metal polymeric polycarboxylates of the invention is reversible. This means that the solvent can be separated from the thickener and that the same polymeric thickener can then be redissolved in the same or another appropriate non-polar solvent to achieve a thickening effect. However, while it is thus possible to first prepare the polymeric polycarboxylates of the invention and then dissolve them in the non-polar solvent to be thickened, the in situ formation of the polymeric salts permits better control of the resulting thickening effect. Also, the thickening effect is obtained at an equilibrium state much more rapidly when the salts are formed in situ.

The alkali polymeric polycarboxylates of the invention are highly effective thickeners for non-polar solvents of the previously specified class. Such solvent and thickener compositions can be employed to great advantage in compositions where viscosity control or gelation is desired. Examples of such applications are in explosive compositions, rocket fuels, pigment coatings, lacquers and lubricants wherein viscosity control is necessary. Such thickeners are also highly useful for improving the persistence of pesticides and fungicides which may, themselves, be non-polar solvents or applied in non-polar solvents.

The following examples are given as further illustrations of the present invention but the invention should not be construed as being limited thereto. Unless otherwise specified, all percentages are based on the total weight of the compositions.

*Example 1*

A terpolymer of styrene, ethyl acrylate and maleic anhydride was prepared by continuously charging a feed mixture comprising 47.5 percent styrene, 47.5% ethyl acrylate and 5 percent maleic anhydride to a polymerization reaction vessel equipped with a stirrer and temperature control means. The reaction mixture was maintained at 177° C. until it contained 30 percent polymer and 70 percent unreacted monomer. Said mixture was then continuously removed from the reaction vessel and passed through a devolatilizer wherein substantially all of the unreacted monomer and other volatile components were removed and recycled to the feed stream. Analysis by infrared techniques indicated that the resulting terpolymer obtained after "steady state" conditions had been reached contained in combined form 61.1 percent styrene, 34.1 percent ethyl acrylate and 4.8 percent maleic anhydride. A 10 percent solution thereof in methyl ethyl ketone had a solution viscosity of 2.31 centipoises.

A 5 percent solution of the above-described terpolymer was prepared in mixed xylenes. Twenty milliliters of this solution was treated with 1 milliliter of a 0.4 molar toluene solution of potassium dodecyl phenolate. The initially thin, oily xylene solution of the terpolymer was thereby converted into a viscoelastic mass resembling a gel but remaining slightly fluid. The maximum thickening effect was achieved after about one hour.

Another 20 milliliter portion of the above-prepared terpolymer-xylene solution was treated with about 5 millimoles of magnesium 2-octylcarbonate. The solution subsequently acquired a very slight haze but its viscosity remained substantially unchanged even upon standing for several hours. This and further additions for the magnesium ions gave no thickening effect.

*Example 2*

A copolymer containing about 97 percent styrene and 3 percent maleic anhydride in chemically combined form was prepared according to a procedure similar to that employed in Example 1. A sufficient quantity of this polymer was dissolved in xylene to provide a solution containing 10 percent polymer solids. To individual portions of this solution were added small amounts of lithium dodecyl phenolate, potassium dodecyl phenolate or aqueous sodium hydroxide. The amount added was sufficient to provide an alkali metal concentration in excess of the stoichiometric requirement based on the total carboxyl functionality. Both the lithium and potassium cations, which were added as alkyl phenolates, resulted in a substantial thickening effect. The aqueous sodium hydroxide gave no effect.

A portion of the above-prepared styrene-maleic anhydride copolymer was hydrolyzed with sodium hydroxide in a methyl ethyl ketone solution of the polymer. The polymer solution was then acidified with hydrochloric acid and precipitated in a 50–50 percent solution of water and methanol. The polymer was recovered by filtration and washed with more of the water-methanol solution. The polymer was then dried and a sufficient quantity thereof was dissolved in xylene to provide a solution having 10 percent polymer solids. Portions of this solution were then treated with lithium and potassium dodecyl phenolates, respectively, with the resulting formation of highly viscous compositions.

From the foregoing, it may be observed that a thickening effect is achieved in accordance with the present invention irrespective of whether the 1,2-dicarboxylic acid copolymers are employed as anhydrides or as free acids.

In a manner similar to that of the foregoing example, other copolymers of lipophilic, ethylenically unsaturated monomers and a sufficient quantity of an ethylenically unsaturated 1,2 - dicarboxylic acid having its carboxyl groups on adjacent carbon atoms such as fumaric, itaconic, citraconic and mesaconic acids to provide at least about 0.05 to about 3 carboxyls or carboxyl-providing groups per 100 combined monomer units are substituted for the terpolymer and copolymer in the above examples to achieve like results. Similarly, other alkali metal salts such as the sodium, cesium and rubidium salts of the polymers employed in the foregoing examples can be substituted for the lithium and potassium salts employed therein to achieve comparable results. Likewise, other non-polar solvents such as benzene, toluene, ethylbenzene, propylbenzene, naphthalene, mesitylene, styrene, armethylstyrene, tetralin, methyl chloride, methylene chloride, carbon tetrachloride, methyl bromide, methyl iodide, ethyl chloride, ethyl bromide, ethyl iodide, 1,2-dichloroethane, 1,2-dibromoethane, 1,1,1-trichloroethane, 1,2-dichloroethylene, propylene chloride, amyl chloride, chlorobenzene, dichlorobenzene, trichlorobenzene, tetrachlorobenzene, hexachlorobenzene, chlorotoluene, bromotoluene, chloroethylbenzene, nitrobenzene, nitrotoluene, carbon disulfide, diethyl sulfide, dimethyl sulfide, methyl ethyl sulfide, diphenyl sulfide, methyl phenyl sulfide, triethylphosphate, tricresylphosphate and the like are substituted for the xylenes employed in the above examples with the achievement of comparable results.

What is claimed is:

1. A composition of matter comprising a non-polar organic solvent having a solubility parameter from about 8.2 to about 10.5 at 25° C. selected from the group of non-polar organic solvents consisting of aromatic hydrocarbons, halogenated aromatic hydrocarbons, halogenated aliphatic hydrocarbons, mononitro-substituted aromatic hydrocarbons, alkyl and aryl thioethers, carbon disulfide and trialkyl and triaryl esters of phosphoric acid; and dissolved therein a thickening quantity of an alkali metal salt of a copolymer selected from the group consisting of 1,2-dicarboxylic acid copolymers containing in combined form from at least about 0.05 up to an upper limit of about 3 mole percent of an ethylenically unsaturated 1,2-dicarboxylic acid and 1,2-dicarboxylic anhydride copolymers containing in combined form from about 0.1 to about 10 mole percent of an ethylenically unsaturated 1,2-dicarboxylic anhydride, the remainder of each of the foregoing copolymers consisting of at least one ethylenically unsaturated lipophilic monomer in chemically combined form, said alkali metal salt of the copolymer being further characterized in that it contains at least about 0.05 and up to no more than about 3 monovalent metal carboxylate groups per 100 combined monomer units.

2. A composition of matter as in claim 1 wherein the quantity of the alkali metal salt of the copolymer employed ranges from about 0.1 to about 10 percent by weight of the non-polar solvent.

3. A composition of matter as in claim 1 wherein the alkali metal salt of the copolymer is the sodium salt.

4. A composition of matter as in claim 1 wherein the alkali metal salt of the copolymer is the potassium salt.

5. A composition of matter comprising a non-polar organic solvent having a solubility parameter from about 8.2 to about 10.5 at 25° C. selected from the group of non-polar organic solvents consisting of aromatic hydrocarbons, halogenated aromatic hydrocarbons, halogenated aliphatic hydrocarbons, mononitro-substituted aromatic hydrocarbons, alkyl and aryl thioethers, carbon disulfide and trialkyl and triaryl esters of phosphoric acid and dissolved therein from about 0.1 to about 10 percent by weight of the non-polar solvent of an alkali metal salt of a 1,2-dicarboxylic acid copolymer acid consisting of at least about 0.05 up to an upper limit of about 3 mole percent of an ethylenically unsaturated 1,2-dicarboxylic acid copolymerized with an ethylenically unsaturated lipophilic monomer, said alkali metal salt of the copolymer being further characterized in that it contains at least about 0.05 and up to no more than about 3 monovalent metal carboxylate groups per 100 combined monomer units.

6. A composition of matter comprising a non-polar organic solvent having a solubility parameter from about 8.2 to about 10.5 at 25° C. selected from the group of non-polar solvents consisting of aromatic hydrocarbons, halogenated aromatic hydrocarbons, halogenated aliphatic hydrocarbons, mononitro-substituted aromatic hydrocarbons, alkyl and aryl thioethers, carbon disulfide and trialkyl and triaryl esters of phosphoric acid and dissolved therein from about 0.1 to about 10 percent by weight of the non-polar solvent of an alkali metal salt of a 1,2-dicarboxylic anhydride copolymer anhydride consisting of from about 0.1 to about 10 mole percent of an ethylenically unsaturated 1,2-dicarboxylic anhydride copolymerized with an ethylenically unsaturated lipophilic monomer, said alkali metal salt of the copolymer being further characterized in that it contains at least about 0.05 and up to no more than about 3 monovalent metal carboxylate groups per 100 combined monomer units.

7. A process for thickening a non-polar organic solvent having a solubility parameter from about 8.2 to about 10.5 at 25° C. selected from the group of non-polar solvents consisting of aromatic hydrocarbons, halogenated aromatic hydrocarbons, halogenated aliphatic hydrocarbons, mononitro-substituted aromatic hydrocarbons, alkyl and aryl thioethers, carbon disulfide and trialkyl and triaryl esters of phosphoric acid, which method comprises admixing with said solvent in any order (A) at least 0.1 percent and up to about 10 percent by weight of the non-polar organic solvent of a lipophilic linear copolymer selected from the group consisting of 1,2-dicarboxylic acid copolymers containing in combined form from at least about 0.05 up to an upper limit of about 3 mole percent of an ethylenically unsaturated 1,2-dicarboxylic acid and 1,2-dicarboxylic anhydride copolymers containing in combined form from about 0.1 to about 10 mole percent of an ethylenically unsaturated 1,2-dicarboxylic anhydride, the remainder of each of the foregoing copolymers consisting of at least one ethylenically unsaturated lipophilic monomer in chemically combined form and (B) a sufficient amount of an alkali metal cation in the form of a salt of an oil-soluble, weak organic acid to provide from about 0.05 to about 3 alkali metal carboxylate groups per 100 combined monomer units.

8. A process for thickening a non-polar organic solvent having a solubility parameter from about 8.2 to about 10.5 at 25° C. selected from the group of non-polar solvents consisting of aromatic hydrocarbons, halogenated aromatic hydrocarbons, halogenated aliphatic hydrocarbons, mononitro-substituted aromatic hydrocarbons, alkyl and aryl thioethers, carbon disulfide and trialkyl and triaryl esters of phosphoric acid, which method comprises admixing with said solvent in any order (A) at least 0.1 percent and up to about 10 percent by weight of the non-polar organic solvent of a lipophilic linear copolymer selected from the group consisting of 1,2-dicarboxylic acid copolymers containing in combined form from at least about 0.05 up to an upper limit of about 3 mole percent of an ethylenically unsaturated 1,2-dicarboxylic acid and 1,2-dicarboxylic anhydride copolymers containing in combined form from about 0.1 to about 10 mole percent of an ethylenically unsaturated 1,2-dicarboxylic anhydride, the remainder of each of the foregoing copolymers consisting of at least one ethylenically unsaturated lipophilic monomer in chemically combined form and (B) a sufficient amount of an alkali metal cation in the form of an alkali metal alkylphenolate to provide from about 0.05 to about 3 alkali metal carboxylate groups per 100 combined monomer units.

References Cited by the Examiner
UNITED STATES PATENTS

| | | | |
|---|---|---|---|
| 2,657,189 | 10/53 | Pinkney | 260—30.6 |
| 2,702,796 | 2/55 | Fine | 260—30.8 |
| 2,912,413 | 11/59 | Bear | 260—78.5 |
| 2,923,692 | 2/60 | Ackerman et al. | 260—33.6 |
| 2,929,785 | 3/60 | Morway et al. | 252—41 |
| 2,937,993 | 5/60 | Pattenden et al. | 252—41 |
| 2,978,372 | 4/61 | Bergstedt et al. | 260—30.6 |
| 3,000,825 | 9/61 | Wanless et al. | 252—41 |
| 3,030,342 | 4/62 | Tiefenthal | 260—78.5 |

FOREIGN PATENTS 492,320  9/38  Great Britain.

MORRIS LIEBMAN, *Primary Examiner.*

DANIEL ARNOLD, ALEXANDER H. BRODMERKEL, *Examiners.*